(12) United States Patent
Hama

(10) Patent No.: US 9,045,622 B2
(45) Date of Patent: Jun. 2, 2015

(54) MODIFIED CONJUGATED DIENE-BASED POLYMER, POLYMER COMPOSITION, AND PROCESS FOR PRODUCING MODIFIED CONJUGATED DIENE-BASED POLYMER

(71) Applicant: Sumitomo Chemical Company, Limited, Tokyo (JP)

(72) Inventor: Hisakatsu Hama, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/334,271

(22) Filed: Jul. 17, 2014

(65) Prior Publication Data

US 2014/0329963 A1 Nov. 6, 2014

Related U.S. Application Data

(62) Division of application No. 13/205,954, filed on Aug. 9, 2011, now Pat. No. 8,809,449.

(30) Foreign Application Priority Data

Aug. 10, 2010 (JP) ................................. 2010-179307

(51) Int. Cl.
| | | |
|---|---|---|
| *B60C 1/00* | (2006.01) | |
| *C08K 3/36* | (2006.01) | |
| *C08C 19/20* | (2006.01) | |
| *C08K 5/548* | (2006.01) | |
| *C08F 36/06* | (2006.01) | |

(52) U.S. Cl.
CPC . *C08K 3/36* (2013.01); *C08C 19/20* (2013.01); *C08K 5/548* (2013.01); *C08F 36/06* (2013.01)

(58) Field of Classification Search
CPC .......... C08C 19/20; C08K 5/548; C08F 36/06
USPC ........................................................ 524/571
See application file for complete search history.

(56) References Cited

U.S. PATENT DOCUMENTS

| 4,581,297 | A | 4/1986 | Delseth et al. | |
|---|---|---|---|---|
| 6,369,151 | B1 * | 4/2002 | Mizuno et al. ................ | 524/492 |
| 2004/0132911 | A1 | 7/2004 | Sharma | |
| 2012/0088928 | A1 * | 4/2012 | Ozturk et al. ................. | 560/309 |

FOREIGN PATENT DOCUMENTS

| JP | 2007-238805 A | 9/2007 |
|---|---|---|
| JP | 2010-280802 | 12/2010 |
| JP | 2011-012096 | 1/2011 |
| JP | 2011-046857 | 3/2011 |
| JP | 2011-046858 | 3/2011 |
| JP | 2011-093851 | 5/2011 |
| WO | WO-2010/140704 A1 | 12/2010 |
| WO | WO-2011/001990 A1 | 1/2011 |

OTHER PUBLICATIONS

"Comparison between Carbon and Silica in Tread Composition", Journal of the Society of Rubber Industry, Japan, 1999, vol. 72, No. 12, pp. 697-700. (Extraction submitted, 11 pgs.).

"Introduction for Rubber Technology", edited by The Society of Rubber Industry, Japan and published by Maruzen, 2004, pp. 123-124. (Extraction submitted, 2 pgs).

Office Action dated Feb. 18, 2014 issued in Japanese Application No. 2010-179307.

US Notice of Allowance dated Apr. 10, 2014 issued in U.S. Appl. No. 13/205,954.

US Office Action dated Nov. 20, 2013 issued in U.S. Appl. No. 13/205,954.

* cited by examiner

*Primary Examiner* — Alexander Kollias
(74) *Attorney, Agent, or Firm* — Foley & Lardner LLP

(57) ABSTRACT

Disclosed are a modified conjugated diene-based polymer capable of providing a polymer composition improved in tan δ balance, a polymer composition containing the modified conjugated diene-based polymer and silica, and a process for producing the modified conjugated diene-based polymer. The modified conjugated diene-based polymer is obtained by melt-kneading a conjugated diene-based polymer and 0.01 to 2 parts by weight of a Bunte salt per 100 parts by weight of the conjugated diene-based polymer, in the presence of water whose amount is from 0.1 to 1,000 parts by weight per one part by weight of the Bunte salt.

6 Claims, No Drawings

MODIFIED CONJUGATED DIENE-BASED POLYMER, POLYMER COMPOSITION, AND PROCESS FOR PRODUCING MODIFIED CONJUGATED DIENE-BASED POLYMER

CROSS-REFERENCE TO RELATED PATENT APPLICATIONS

This application is a Divisional of U.S. application Ser. No. 13/205,954, filed Aug. 9, 2011, which claims priority to Japanese Patent Application 2010-179307, filed Aug. 10, 2010 the disclosures of which are hereby incorporated by reference in their entirety.

BACKGROUND OF THE INVENTION

The present invention relates to a modified conjugated diene-based polymer, a polymer composition and a process for producing a modified conjugated diene-based polymer.

Tires for automobiles are required to have low rolling resistance, wet grip, etc. Various researches and studies have been made so far in order to achieve a good balance between low rolling resistance and wet grip which hitherto have been considered to have a trade-off relationship with each other.

Polymer compositions for use in production of tires for automobiles are also required to be excellent in low rolling resistance and wet grip. In the field of these polymer compositions, a tan δ balance of such a polymer composition is used as a barometer for tire performance: for example, a tan δ value of the polymer composition at a temperature of from 50 to 70° C. is used as a barometer for low rolling resistance, and a tan δ value of the polymer composition at 0° C. is used as a barometer for wet grip. A polymer composition which shows a larger tan δ balance (i.e., a ratio of a tan δ value at 0° C. to a tan δ value at a temperature of from 50 to 70° C.) is considered to be suitable as a polymer composition for tires (refer to Non-Patent Documents 1 and 2).

REFERENCES

Non-Patent Documents

Non-Patent Document 1:
"Introduction for Rubber Technology," p. 124, edited by THE SOCIETY OF RUBBER INDUSTRY, JAPAN and published by MARUZEN
Non-Patent Document 2:
The article of "Comparison between Carbon and Silica in Tread Composition," by Naoichi Kobayashi, vol. 72, No. 12, p. 697, the journal of THE SOCIETY OF RUBBER INDUSTRY, JAPAN, 1999

SUMMARY OF THE INVENTION

Under such a situation, objects of the present invention are to provide a modified conjugated diene-based polymer capable of providing a polymer composition improved in tan δ balance, a polymer composition containing the modified conjugated diene-based polymer and silica, and a process for producing the modified conjugated diene-based polymer.

The first aspect of the present invention relates to a modified conjugated diene-based polymer which is obtained by melt-kneading a conjugated diene-based polymer and 0.01 to 2 parts by weight of a Bunte salt per 100 parts by weight of the conjugated diene-based polymer, in the presence of 0.1 to 1,000 parts by weight of water per one part by weight of the Bunte salt.

The second aspect of the present invention relates to a polymer composition containing the above-described modified conjugated diene-based polymer and silica.

The third aspect of the present invention relates to a process for producing a modified conjugated diene-based polymer by melt-kneading a conjugated diene-based polymer and 0.01 to 2 parts by weight of a Bunte salt per 100 parts by weight of the conjugated diene-based polymer, in the presence of 0.1 to 1,000 parts by weight of water per one part by weight of the Bunte salt.

The present invention is intended to provide the following:

<1> A modified conjugated diene-based polymer obtained by melt-kneading a conjugated diene-based polymer and 0.01 to 2 parts by weight of a Bunte salt per 100 parts by weight of the conjugated diene-based polymer, in the presence of water whose amount is from 0.1 to 1,000 parts by weight per one part by weight of the Bunte salt.

<2> The modified conjugated diene-based polymer of <1>, wherein the Bunte salt is S-(3-aminopropyl)thiosulfuric acid or its metal salt.

<3> The modified conjugated diene-based polymer of <2>, wherein the metal salt is at least one metal salt selected from the group consisting of a lithium salt of S-(3-aminopropyl)thiosulfuric acid, a sodium salt of S-(3-aminopropyl)thiosulfuric acid, a potassium salt of S-(3-aminopropyl)thiosulfuric acid, a cesium salt of S-(3-aminopropyl)thiosulfuric acid, a cobalt salt of S-(3-aminopropyl)thiosulfuric acid, a copper salt of S-(3-aminopropyl)thiosulfuric acid and a zinc salt of S-(3-aminopropyl)thiosulfuric acid.

<4> The modified conjugated diene-based polymer of any one of <1> to <3>, wherein the conjugated diene-based polymer is a conjugated diene-vinyl aromatic compound copolymer.

<5> A polymer composition containing
a polymer component, and
10 to 150 parts by weight of a reinforcing agent per 100 parts by weight of the polymer component,
wherein 10% by weight or more of the modified conjugated diene-based polymer defined in any one of <1> to <4> is contained, provided that the amount of the polymer component is 100% by weight, and wherein 30% by weight or more of silica is contained per 100% by weight of the reinforcing agent.

<6> The polymer composition of <5>, containing 1 to 20 parts by weight of a silane coupling agent per 100 parts by weight of the silica.

<7> A process for producing a modified conjugated diene-based polymer, by melt-kneading a conjugated diene-based polymer and 0.01 to 2 parts by weight of a Bunte salt per 100 parts by weight of the conjugated diene-based polymer, in the presence of water whose amount is from 0.1 to 1,000 parts by weight per one part by weight of the Bunte salt.

<8> The process of <7>, comprising the steps of
supplying the conjugated diene-based polymer from a material supply port of a vent type extruder, to the inside of the extruder,
supplying an aqueous solution of the Bunte salt from a liquid injection port located on the downstream side from the material supply port, to the inside of the extruder,
melt-kneading the conjugated diene-based polymer and the Bunte salt in the presence of water,
drawing out a volatile component containing water from a vent port, and
extruding the conjugated diene-based polymer.
<9> The process of <7> or <8>, wherein the Bunte salt is S-(3-aminopropyl)thiosulfuric acid or its metal salt.

<10> The process of <9>, wherein the metal salt is at least one metal salt selected from the group consisting of a lithium salt of S-(3-aminopropyl)thiosulfuric acid, a sodium salt of S-(3-aminopropyl)thiosulfuric acid, a potassium salt of S-(3-aminopropyl)thiosulfuric acid, a cesium salt of S-(3-aminopropyl)thiosulfuric acid, a cobalt salt of S-(3-aminopropyl)thiosulfuric acid, a copper salt of S-(3-aminopropyl)thiosulfuric acid and a zinc salt of S-(3-aminopropyl)thiosulfuric acid.

According to the present invention, there can be provided a modified conjugated diene-based polymer capable of providing a polymer composition improved in tan δ balance, a polymer composition containing the modified conjugated diene-based polymer and silica, and a process for producing the modified conjugated diene-based polymer.

DETAILED DESCRIPTION OF THE PREFERRED EMBODIMENTS

A conjugated diene-based polymer is a polymer which contains a structural unit based on a conjugated diene (a conjugated diene unit). Examples of the conjugated diene include 1,3-butadiene, isoprene, 1,3-pentadiene, 2,3-dimethyl-1,3-butadiene and 1,3-hexadiene. As the conjugated diene, at least one kind selected from these is used. Preferable as the conjugated diene is 1,3-butadiene or isoprene.

The conjugated diene-based polymer may contain a structural unit based on other monomer, in addition to the conjugated diene unit. Examples of other monomer include vinyl aromatic compounds, vinyl nitrile and unsaturated carboxylates. Examples of the vinyl aromatic compounds include styrene, α-methylstyrene, vinyltoluene, vinylnaphthalene, divinylbenzene, trivinylbenzene and divinylnaphthalene. Examples of the vinylnitrile include acrylonitrile. Examples of the unsaturated carboxylates include methyl acrylate, ethyl acrylate, methyl methacrylate and ethyl methacrylate. Preferable among them are the vinyl aromatic compounds. More preferable among them is styrene.

Examples of the conjugated diene-based polymer include conjugated diene polymers such as poly(1,3-butadiene), polyisoprene and 1,3-butadiene-isoprene copolymers; conjugated diene-vinyl aromatic compound copolymers such as 1,3-butadiene-styrene copolymers and isoprene-styrene copolymers; acrylonitrile-butadiene copolymers; isoprene-isobutylene copolymers; and ethylene-propylene-diene copolymers. Preferable among them are the conjugated diene polymers and the conjugated diene-vinyl aromatic compound copolymers.

Preferably, the conjugated diene polymer contains a structural unit based on the vinyl aromatic compound (i.e., a vinyl aromatic compound unit). A content of the vinyl aromatic compound unit is 0% by weight or more, preferably 10% by weight or more (while a content of the conjugated diene unit is 90% by weight or less), more preferably 15% by weight or more (while a content of the conjugated diene unit is 85% by weight or less), provided that the sum of the conjugated diene unit and the vinyl aromatic compound unit is 100% by weight. Moreover, a content of the vinyl aromatic compound unit is preferably 50% by weight or less (while a content of the conjugated diene unit is 50% by weight or more), more preferably 45% by weight or less (while a content of the conjugated diene unit is 55% by weight or more) in order to improve a tan δ balance of the resultant polymer composition.

In order to improve a tan δ balance of the resultant polymer composition, an amount of the vinyl bond of the conjugated diene-based polymer is preferably 10% by mol or more and 80% by mol or less, more preferably 20% by mol or more and 70% by mol or less, provided that the content of the conjugated diene unit is 100% by mol. The amount of the vinyl bond can be determined from an absorption intensity at and around 910 cm$^{-1}$ as an absorption peak of the vinyl group, by an infrared spectroscopic analyzing method.

A Mooney viscosity (ML$_{1+4}$) of the conjugated diene-based polymer is preferably 10 or more, more preferably 20 or more, in order to improve a strength of the resultant polymer composition. It is preferably 200 or less, more preferably 150 or less, in order to improve processability of the resultant polymer composition. A Mooney viscosity (ML$_{1+4}$) is measured at 100° C. according to the regulation of JIS K6300 (1994).

The Bunte salt is a compound represented by the following formula (I) or (II):

$$H_2N\text{—}X\text{—}SSO_3H \quad\quad (I), or$$

$$(H_2N\text{—}X\text{—}SSO_3^-)_n \cdot M^{n+} \quad\quad (II)$$

wherein X represents a hydrocarbylene group; $M^{n+}$ represents a metal ion; and n is a valence of the metal ion.

Examples of the hydrocarbylene group as X include alkylene groups such as a methylene group, an ethylene group, a trimethylene group, a tetramethylene group, a pentamethylene group, a hexamethylene group, a heptamethylene group and an octamethylene group. Preferable as X is a group represented by —$(CH_2)_m$—, wherein m is a number of from 1 to 10. More preferable as X is a group represented by —$(CH_2)_m$—, wherein m is a number of from 2 to 6. Still more preferable as X is a trimethylene group.

Examples of the metal ion represented by $M^{n+}$ include a lithium ion, a sodium ion, a potassium ion, a cesium ion, a cobalt ion, a copper ion and a zinc ion. Preferable among them are a lithium ion, a sodium ion and a potassium ion.

In the formula, n is a valence of the metal ion. For example, in case of an alkali metal ion such as a lithium ion, a sodium ion, a potassium ion or a cesium ion, n is usually 1. In case of a cobalt ion, n is usually 2 or 3. In case of a copper ion, n is usually an integer of 1 to 3. In case of a zinc ion, n is usually 2.

The Bunte salt is preferably S-(3-aminopropyl)-thiosulfuric acid or its metal salt (i.e., a compound of the above formula in which X is a trimethylene group).

Preferable as a metal salt of S-(3-aminopropyl)thiosulfuric acid are a lithium salt of S-(3-aminopropyl)thiosulfuric acid, a sodium salt of S-(3-aminopropyl)thiosulfuric acid, a potassium salt of S-(3-aminopropyl)thiosulfuric acid, a cesium salt of S-(3-aminopropyl)thiosulfuric acid, a cobalt salt of S-(3-aminopropyl)thiosulfuric acid, a copper salt of S-(3-aminopropyl)thiosulfuric acid and a zinc salt of S-(3-aminopropyl)thiosulfuric acid. More preferable as such are a lithium salt of S-(3-aminopropyl)-thiosulfuric acid, a sodium salt of S-(3-aminopropyl)-thiosulfuric acid and a potassium salt of S-(3-aminopropyl)thiosulfuric acid.

The Bunte salt may be produced by a known process. As a process for producing a metal salt of S-(3-aminopropyl)thiosulfuric acid, the following process (1) or (2) is employed.

(1) A process comprising the step of reacting 3-halopropylamine with sodium thiosulfate.

(2) A process comprising the steps of reacting a phthalimide potassium salt with 1,3-dihalopropane; reacting the resultant compound with sodium thiosulfate; and hydrolyzing the resultant compound.

While a salt of sodium can be obtained by any of the above processes, a salt of other metal can be obtained by cation exchange between the salt of sodium and other metal ion according to a known method.

In this regard, S-(3-aminopropyl)thiosulfuric acid is produced by neutralizing a metal salt of S-(3-aminopropyl)thiosulfuric acid, with a protonic acid.

A modified conjugated diene-based polymer is produced by melt-kneading the conjugated diene-based polymer and the Bunte salt in the presence of water.

A ratio of the Bunte salt to be kneaded is from 0.01 to 2 parts by weight per 100 parts by weight of the conjugated diene-based polymer. In order to improve a tan δ balance of the resultant polymer composition, it is preferably 0.1 part by weight or more, more preferably 0.5 part by weight or more. In order to improve profitability, it is preferably 1.5 parts by weight or less, more preferably 1 part by weight or less.

A ratio of water for use in the melt-kneading of the conjugated diene-based polymer and the Bunte salt is from 0.1 to 1,000 parts by weight per 1 part by weight of the Bunte salt. To more improve a tan δ balance of the resultant polymer composition, it is preferably 0.5 part by weight or more, more preferably 1 part by weight or more. In order to improve profitability, it is preferably 100 parts by weight or less, more preferably 50 parts by weight or less.

A temperature at which the conjugated diene-based polymer and the Bunte salt are melt-kneaded in the presence of water is preferably from 100 to 250° C., more preferably from 120 to 200° C. A kneading time is preferably from 0.1 to 10 minutes, more preferably from 0.5 to 5 minutes.

The melt-kneading may be carried out by the use of a known kneader, for example, an extruder, a banbury mixer or a roll kneader. The melt-kneading by the use of an extruder is preferable.

Examples of a more preferable melt-kneading method include a method by the use of an extruder provided with a material supply port, a liquid injection port and a vent port: that is, this method comprises the steps of supplying the conjugated diene-based polymer from the material supply port to the inside of the extruder; supplying an aqueous solution of the Bunte salt from the liquid injection port to the inside of the extruder; melt-kneading the conjugated diene-based polymer and the Bunte salt in the presence of water; and drawing out a volatile component containing water from the vent port (hereinafter, this method is referred to as an aqueous solution injection-extruding method).

The extruder for use in the aqueous solution injection-extruding method may be any extruder that is provided with a material supply port, a liquid injection port and a vent port, wherein the liquid injection port for the aqueous solution of the Bunte salt is located on the downstream side from the material supply port, and wherein the vent port is located on the downstream side from the liquid injection port for the aqueous Bunte salt solution on the downmost-stream side. That is, a known extruder may be used. The extruder may be of single-stage ventilation type or multistage ventilation type. There may be provided a plurality of liquid injection ports, or there may be provided a liquid injection port other than the liquid injection port for the Bunte salt. A liquid injection port may be provided on the downstream side from a vent port on the downmost-stream side; or a vent port may be provided on the upstream side from a liquid injection port on the uppermost-stream side. The extruder may be a single-screw extruder or a twin-screw extruder.

In the aqueous solution injection-extruding method, the conjugated diene-based polymer in the form of pellets, powder, crumb, a melt or a solution is supplied from the material supply port of the extruder to the inside of the extruder. When the conjugated diene-based polymer in the form of a solution is supplied, an amount of a solvent in the solution is preferably 15% by weight or less, more preferably 10% by weight or less, provided that the amount of the solution is 100% by weight.

When the conjugated diene-based polymer in the form of a solution is supplied, a position at which the aqueous Bunte salt solution is supplied to the inside of the extruder is preferably in a zone where the amount of the solvent is 10% by weight or less, more preferably in a zone where the amount of the solvent is 5% by weight or less, provided that the total amount of the conjugated diene-based polymer and the solvent is 100% by weight.

In the aqueous solution injection-extruding method, a weight ratio of the Bunte salt to water in the aqueous Bunte salt solution is preferably from 1/1,000 to 1/0.1. It is preferably 1/0.5 or less, more preferably 1/1 or less, in order to more improve a tan δ balance of the resultant polymer composition. It is preferably 1/100 or more, more preferably 1/50 or more, in order to improve profitability.

An amount of the aqueous Bunte salt solution to be supplied to the inside of the extruder is from 0.01 to 2 parts by weight in terms of an amount of the Bunte salt, per 100 parts by weight of the conjugated diene-based polymer. It is preferably 0.1 part by weight or more, more preferably 0.5 part by weight or more, in order to more improve a tan δ balance of the resultant polymer composition. It is preferably 1.5 parts by weight or less, more preferably 1 part by weight or less, in order to improve profitability. In case where the aqueous Bunte salt solution is supplied from a plurality of liquid injection ports to the inside of the extruder, the above-specified amount of the aqueous Bunte salt solution is the sum of the amounts of the aqueous Bunte salt solution supplied from the plurality of liquid injection ports.

A position of the extruder, at which the aqueous Bunte salt solution is supplied, is preferably in a zone where a temperature of the conjugated diene-based polymer in the extruder is 100 to 250° C. A temperature of the conjugated diene-based polymer in this zone is more preferably 200° C. or lower. The temperature of the conjugated diene-based polymer in this zone is more preferably 120° C. or higher.

When the conjugated diene-based polymer in the form of a solution is supplied, a position of the extruder, at which the aqueous Bunte salt solution is supplied, is preferably in a zone where the amount of the solvent is 10% by weight or less, more preferably in a zone where the amount of the solvent is 5% by weight or less, provided that the total amount of the conjugated diene-based polymer and the solvent is 100% by weight.

A residence time during which the conjugated diene-based polymer is resident in a zone inside the extruder where the conjugated diene-based polymer and the Bunte salt are melt-kneaded in the presence of water is preferably 0.1 minute or longer, more preferably 0.5 minute or longer. In case where a plurality of such zones are present in the extruder, the above-specified residence time is the sum of the respective residence times in the plurality of the zones. For example, the following case is supposed: the aqueous Bunte salt solution is supplied from a first liquid injection port; water is drawn out from a first vent port on the downstream side from the first liquid injection port; then, water or the aqueous Bunte salt solution is supplied from a second liquid injection port on the further downstream side; and water is drawn out from a second vent port on the downstream side from the second liquid injection port for extrusion. In this case, total of a residence time in a region from the first liquid injection port to the first vent port and a residence time in a region from the second liquid injection port to the second vent port is defined as the above-specified residence time.

In the aqueous solution injection-extruding method, a residence time of the conjugated diene-based polymer in the inside of the extruder is preferably 10 minutes or shorter, more preferably 5 minutes or shorter.

The vent port is decompressed with a vacuum pump or the like to draw out a volatile component such as an organic solvent, monomers and a solvent of a polyhydric alcohol solution. A pressure in the vent port is usually from 5 to 100 kPa-A, preferably from 10 to 95 kPa-A. In case where there are provided a plurality of vent holes, it is preferable to increase a rate of reduction in pressure toward the downstream side in the extruder in view of a drawing efficiency.

A temperature of the conjugated diene-based polymer extruded from a die is preferably from 150 to 220° C.

A Mooney viscosity ($ML_{1+4}$) of a modified conjugated diene-based polymer to be obtained by the process of the present invention is preferably 10 or more, more preferably 20 or more, in order to improve a strength of the resultant polymer composition. It is preferably 200 or less, more preferably 150 or less, in order to improve processability of the resultant polymer composition. A Mooney viscosity ($ML_{1+4}$) is measured at 100° C. according to the regulation of JIS K6300 (1994).

To more improve a tan δ balance of the resultant polymer composition, an amount of the vinyl bond in the modified conjugated diene-based polymer is preferably 10% by mol or more and 80% by mol or less, more preferably 20% by mol or more and 70% by mol or less, provided that the content of the conjugated diene unit is 100% by mol. The amount of the vinyl bond is determined from an absorption intensity at and around 910 $cm^{-1}$ as an absorption peak of the vinyl group by an infrared spectroscopic analyzing method.

Preferably, the modified conjugated diene-based polymer contains a structural unit based on a vinyl aromatic compound (i.e., a vinyl aromatic compound unit) in order to improve a strength of the resultant polymer composition. A content of the vinyl aromatic compound unit is 0% by weight or more, preferably 10% by weight or more (while a content of the conjugated diene unit is 90% by weight or less), more preferably 15% by weight or more (while a content of the conjugated diene unit is 85% by weight or less), provided that the sum of the conjugated diene unit and the vinyl aromatic compound unit is 100% by weight. The content of the vinyl aromatic compound unit is preferably 50% by weight or less (while a content of the conjugated diene unit is 50% by weight or more), more preferably 45% by weight or less (while a content of the conjugated diene unit is 55% by weight or more) in order to improve a tan δ balance of the resultant polymer composition.

The modified conjugated diene-based polymer of the present invention may be mixed with other polymer component, additives, etc. to prepare a polymer composition for use.

Examples of other polymer component include conventional ones, such as polybutadiene, polyisoprene, a styrene-butadiene copolymer, an isoprene-styrene copolymer, a butadiene-isoprene copolymer, an acrylonitrile-butadiene copolymer, an isoprene-isobutylene copolymer, an ethylene-propylene-diene copolymer and butyl rubber. Natural rubber, an ethylene-propylene copolymer and an ethylene-octene copolymer are also included in examples thereof. One or more kinds selected from these polymer components may be used.

When the modified conjugated diene-based polymer is mixed with other polymer component, a content of the modified conjugated diene-based polymer is preferably 10% by weight or more, more preferably 20% by weight or more, still more preferably 30% by weight or more, particularly 50% by weight or more, provided that the sum of the polymer components is 100% by weight, in order to more improve a tan δ balance of the resultant polymer composition.

As the additives, known additives may be used. Examples of the additives include reinforcing agents such as silica and carbon black; fillers such as calcium carbonate, talc, alumina, clay, aluminum hydroxide and mica; silane coupling agents; extender oils; vulcanizing agents such as sulfur and organic peroxides; vulcanizing accelerators such as thiazole-based vulcanizing accelerators, thiuram-based vulcanizing accelerators, sulfenamide-based vulcanizing accelerators and guanidine-based vulcanizing accelerators; vulcanizing activators such as stearic acid and zinc oxide; processing assistants; antioxidants; and lubricants.

Examples of the silica include dry silica (anhydrous silicic acid), wet silica (water-containing silicic acid), colloidal silica, precipitated silica, calcium silicate and aluminum silicate. Two or more kinds selected from these may be used. A BET specific surface area of silica is usually from 50 to 250 $m^2/g$. A BET specific surface area is measured according to the regulation of ASTM D1993-03. Examples of commercially available products of silica include ULTRASIL® VN3-G manufactured by Evonik Degussa GmbH, VN 3, AQ, ER and RS-150 manufactured by TOSOH SILICA CORPORATION, Zeosil 1115MP and 1165MP manufactured by Rhodia Group, etc.

Examples of the carbon black include channel carbon black such as EPC, MPC and CC; furnace carbon black such as SAF, ISAF, HAF, MAF, FEF, SRF, GPF, APF, FF, CF, SCF and ECF; thermal carbon black such as FT and MT; acetylene carbon black; and graphite. Two or more kinds selected from these may be used.

A nitrogen adsorption specific surface area ($N_2SA$) of carbon black is usually from 5 to 200 $m^2/g$, while a dibutyl phthalate (DBP) absorption amount of carbon black is usually from 5 to 300 ml/100 g. The nitrogen adsorption specific surface area is measured according to the regulation of ASTM D4820-93, and the DBP absorption amount is measured according to the regulation of ASTM D2414-93. Commercially available products such as DIABLACK® N339 from Mitsubishi Chemical Corporation, SEAST® 6, SEAST® 7HM and SEAST® KH from TOKAI CARBON CO., LTD., CK® 3 and Special Black® 4A from Evonik Degussa GmbH may be used as the carbon black.

When a polymer composition is prepared by adding reinforcing agents to the modified conjugated diene-based polymer, an amount of the reinforcing agents to be added is usually from 10 to 150 parts by weight per total 100 parts by weight of the polymer components. This addition amount is preferably 20 parts by weight or more, more preferably 30 parts by weight or more, in order to improve a friction resistance and strength of the resultant polymer composition. This addition amount is preferably 120 parts by weight or less, more preferably 100 parts by weight or less, in order to improve a reinforcing property of the resultant polymer composition.

Preferably, the polymer composition contains silica as a reinforcing agent. A content of silica is preferably 30% by weight or more, more preferably 50% by weight or more, still more preferably 70% by weight or more, particularly 80% by weight or more, provided that a total amount of the reinforcing agents is 100% by weight.

Examples of the silane coupling agent include vinyl trichrolosilane, vinyl triethoxysilane, vinyl tris(β-methoxyethoxy)silane, β-(3,4-epoxycyclohexyl)ethyl-trimethoxysilane, γ-glycydoxypropyltrimethoxysilane, γ-methacryloxypropyltrimethoxysilane, N-(β-aminoethyl)-γ- aminopropyltrimethoxysilane, N-(β-aminoethyl)-γ-aminopropylmethyldimethoxysilane, N-phenyl-δ-aminopropyltrimethoxysilane, δ-chloropropyltrimethoxysilane, γ-mercaptopropyltrimethoxysilane, γ-aminopropyltriethoxy-silane, bis(3-(triethoxysilyl)propyl)disulfide, bis(3-(triethoxysilyl)propyl)tetrasulfide, γ-trimethoxysilyl-propyldimethylthiocarbamyltetrasulfide and γ-trimethoxysilylpropylbenzothiazyltetrasulfide. Two or more kinds selected from these may be used. Commercially available product usable as such are Si® 69 and Si® 75 from Evonik Degussa GmbH, etc.

When a polymer composition is prepared by adding the silane coupling agent to the modified conjugated diene-based polymer, an amount of the silane coupling agent to be added is preferably from 1 to 20 parts by weight, more preferably from 2 to 15 parts by weight, still more preferably from 5 to 10 parts by weight, per 100 parts by weight of silica.

Examples of the above-described extender oil include an aromatic mineral oil (with a viscosity gravity constant (V.G.C. value) of from 0.900 to 1.049), a naphthene-based mineral oil (with a V.G.C. value of from 0.850 to 0.899) and a paraffin-based mineral oil (with a V.G.C. value of from 0.790 to 0.849). A polycyclic aromatic group content of the extender oil is preferably less than 3% by weight, more preferably less than 1% by weight. The polycyclic aromatic group content is measured according to the rule 346/92 of Institute Petroleum. An aromatic compound content (CA) of the extender oil is preferably 20% by weight or more. Two or more kinds selected from these may be used.

Examples of the above-described sulfur include powdery sulfur, precipitated sulfur, colloidal sulfur, insoluble sulfur and highly dispersible sulfur, among which powdery sulfur and insoluble sulfur are preferable.

Examples of the above-described organic peroxide include dicumyl peroxide, 2,5-dimethyl-2,5-di(tertiary butylperoxy) hexane, 2,5-dimethyl-2,5-di(benzoylperoxy)-hexane, 2,5-dimethyl-2,5-(tertiary butylperoxy)hexine-3, ditertiary butyl peroxide, ditertiary butyl peroxide-3,3,5-trimethylcyclohexane, tertiary butyl hydroperoxide, etc.

When a polymer composition is prepared by adding a vulcanizing agent to the modified conjugated diene-based polymer, an amount of the vulcanizing agent to be added is preferably from 0.1 to 15 parts by weight, more preferably from 0.3 to 10 parts by weight, still more preferably from 0.5 to 5 parts by weight, per 100 parts by weight of the polymer component.

Examples of the above-described vulcanizing accelerator include thiazole-based vulcanizing accelerators such as 2-mercaptobenzothiazole, dibenzothiazyldisulfide and N-cyclohexyl-2-benzothiazylsulfenamide; thiuram-based vulcanizing accelerators such as tetramethylthiuram monosulfide and tetramethylthiuram disulfide; sulfenamide-based vulcanizing accelerators such as N-cyclohexyl-2-benzothiazolsulfenamide, N-t-butyl-2-benzothiazolsulfenamide, N-oxyethylene-2-benzothiazolsulfenamide, N-oxyethylene-2-benzothiazolsulfenamide and N,N'-diisopropyl-2-benzothiazolsulfenamide; and guanidine-based vulcanizing accelerators such as diphenylguanidine, diorthotolyl-guanidine and orthotolylbiguanidine.

When a polymer composition is prepared by adding the vulcanizing accelerator to the modified conjugated diene-based polymer, an amount of the vulcanizing accelerator to be added is preferably from 0.1 to 5 parts by weight, more preferably from 0.2 to 3 parts by weight, per 100 parts by weight of the polymer component.

The method for preparing a polymer composition by adding other polymer component and additives to the modified conjugated diene-based polymer may be any of known methods. For example, the respective components may be kneaded by the use of a known mixer such as rolls or a banbury mixer.

Kneading conditions in case where a polymer composition is prepared by adding the additives other than the vulcanizing agent and the vulcanizing accelerator are described below: a kneading temperature is usually from 50 to 200° C., preferably from 80 to 190° C.; and a kneading time is usually from 30 seconds to 30 minutes, preferably from 1 to 30 minutes. Kneading conditions in case where a polymer composition is prepared by adding the vulcanizing agent and the vulcanizing accelerator are described below: a kneading temperature is usually 100° C. or lower, preferably from a room temperature to 80° C.; and a vulcanizing temperature is usually from 120 to 200° C., preferably from 140 to 180° C., when the polymer composition mixed with the vulcanizing agent and the vulcanizing accelerator is subjected to a vulcanizing treatment such as press vulcanizing.

The modified conjugated diene-based polymer and the modified conjugated diene-based polymer composition are used in tires, shoe soles, flooring materials, vibration proofing materials, etc., and are particularly suitable for use in tires.

EXAMPLES

Hereinafter, the present invention will be described by way of Examples and Comparative Examples, which however should not be construed as limiting the scope of the present invention in any way.

The physical properties were evaluated by the following methods.

1. Mooney Viscosity ($ML_{1+4}$)

A Mooney viscosity of the polymer was measured at 100° C. according to the regulation of JIS K6300 (1994).

2. Vinyl Content (% by Mol in Unit)

A vinyl content of the polymer was determined from an absorption intensity at and around 910 $cm^{-1}$ as an absorption peak of the vinyl group by an infrared spectroscopic analyzing method.

3. Styrene Unit Content (% by Weight in Unit)

A styrene unit content of the polymer was determined from a refractive index according to the regulation of JIS K6383 (1995).

4. Molecular Weight Distribution (Mw/Mn)

A weight-average molecular weight (Mw) and a number-average molecular weight (Mn) were measured by gel permeation chromatography (GPC) under the following conditions (1) to (8) so as to determine a molecular weight distribution (Mw/Mn) of the polymer.

(1) Apparatus: HLC-8020 manufactured by TOSOH CORPORATION
(2) Separation column: GMH-XL (two columns in series) manufactured by TOSOH CORPORATION
(3) Measuring temperature: 40° C.
(4) Carrier: tetrahydrofuran
(5) Flow rate: 0.6 mL/min.
(6) Injection amount: 5 µL
(7) Detector: differential refractiometer
(8) Molecular weight standard: standard polystyrene 5. Tan δ Balance Strip-like test pieces of 4 mm in width, 1 mm in thickness and 40 mm in length were punched from a sheet-like vulcanized molded article and were then subjected to the tests. A viscoelasticity measuring apparatus (manufactured by Ueshima Seisakusho Co., Ltd.) was used to measure a loss tangent of the test piece at 0° C. (tan δ (0° C.)) under the conditions of a deformation of 0.25% and a frequency of 10 Hz, and to measure a loss tangent of the test piece at 70° C. (tan δ (70° C.)) under the conditions of a deformation of 1% and a frequency of 10 Hz. Next, a ratio of tan δ (0° C.)/tan δ (70° C.) was determined to thereby calculate a tan δ balance.

Reference Example

Preparation of Sodium Salt of
S-(3-Aminopropyl)-Thiosulfuric Acid

A reactor was purged by nitrogen and was then charged with 3-bromopropylamine bromate (25 g, 0.11 mol), sodium thiosulfate pentahydrate (28.42 g, 0.11 mol), methanol (125 ml) and water (125 ml). The mixture in the reactor was refluxed at 70° C. for 4.5 hours. After that, the mixture was allowed to cool and methanol was removed from the mixture under reduced pressure. Next, the mixture from which methanol had been removed was mixed with sodium hydroxide (4.56 g), and the resulting mixture was stirred at room temperature for 30 minutes. Then, the solvent was removed therefrom and was then mixed with ethanol (200 ml). Then, the resulting mixture was refluxed for one hour. After the refluxing, sodium bromide as a side-product was removed from the mixture by hot filtration. The filtrate was decompressed and thus was concentrated until crystals were precipitated. The concentrated solution was left to stand still. The crystals were collected by filtration and were then washed with ethanol and hexane. The resultant crystals were dried in vacuum to obtain a sodium salt of S-(3-aminopropyl)thiosulfuric acid.

$^1$H-NMR (270.05 MHz, MeOD) $\delta_{ppm}$: 3.1 (2H, t, J=6.3 Hz), 2.8 (2H, t, J=6.2 Hz), 1.9-2.0 (2H, m)

A median diameter (50% D) of the sodium salt of S-(3-aminopropyl)thiosulfuric acid, thus obtained, was measured with SALD-2000J manufactured by SHIMADZU CORPORATION, by laser diffractometry. As a result, it was 14.6 μm.

<Measuring Operation>

The resultant sodium salt of S-(3-aminopropyl)thiosulfuric acid was dispersed in a solution mixture of a dispersion solvent (toluene) and a dispersant (a solution of 10% by weight of sodium di-2-ethylhexyl sulfosuccinate in toluene) at room temperature. The resulting dispersed solution was stirred for 5 minutes while being exposed to a ultrasonic wave, to obtain a test solution. This test solution was transferred to a batch cell and was subjected to measurement after the passage of one minute. A refractive index was from 1.70 to 0.20i.

Example 1

Preparation of Modified Polymer

A twine-screw extruder provided with a material supply port, a liquid supply port and a vent port was used. A cylinder temperature of the extruder was set at 150° C., and the following mixture was supplied from the material supply port to the inside of the extruder: the mixture was prepared by mixing an oil extended 1,3-butadiene-styrene copolymer [a content of an extender oil per 100 parts by weight of a 1,3-butadiene-styrene copolymer=18 parts by weight; the 1,3-butadiene-styrene copolymer having a styrene content of 28% by weight and a vinyl content of 36% by mol; a Mooney viscosity (ML$_{1+4}$ (100° C.))=70; and a molecular weight distribution (Mw/Mn)=1.7] and industrial hexane (a content of the industrial hexane per 100 parts by weight of the 1,3-butadiene-styrene copolymer=18 parts by weight). Then, 3 parts by weight of an aqueous solution of the sodium salt of S-(3-aminopropyl)thiosulfuric acid (a concentration of the sodium salt of S-(3-aminopropyl)thiosulfuric acid=33.3% by weight) per 100 parts by weight of the 1,3-butadiene-styrene copolymer was supplied from the liquid supply port to the inside of the extruder. In the extruder, the above-described mixture and the aqueous solution of the sodium salt of S-(3-aminopropyl) thiosulfuric acid were melt-kneaded. The industrial hexane and water were drawn out from the vent port, and then, the oil extended modified polymer was extruded from the die.

A ratio of a mixture supply amount (kg/hr.) to a screw rotation number (rpm) (the mixture supply amount/the screw rotation number) was from 1.1 to 1.2 (kg/hr./rpm). The temperature of the 1,3-styrene-butadiene copolymer found at and around the liquid supply port was about 150° C., and the temperature of the oil extended modified polymer extruded from the die was about 200° C. The time during which the polymer was resident, within the extruder, in a region from the position for supplying the aqueous solution of the sodium salt of the S-(3-aminopropyl)thiosulfuric acid, to the outlet of the die was about 1.5 minutes.

The Mooney viscosity of the resultant oil extended modified polymer was 71, and the molecular weight distribution (Mw/Mn) of the modified polymer was 1.7.

Preparation of Polymer Composition and Vulcanized Sheet

A polymer composition was prepared by kneading the following materials in a laboplast mill: the obtained oil extended modified polymer (118 parts by weight), silica (ULTRASIL® VN3-G manufactured by Evonik Degussa GmbH) (78.4 parts by weight), a silane coupling agent (Si69® manufactured by Evonik Degussa GmbH) (6.4 parts by weight), carbon black (DIABLACK® N339 manufactured by Mitsubishi Chemical Corporation) (6.4 parts by weight), an extender oil (NC-140 manufactured by Nippon Oil Corporation) (29.6 parts by weight), an antioxidant (Antigen® 3C manufactured by Sumitomo Chemical Company, Limited) (1.5 parts by weight), stearic acid (2 parts by weight), zinc oxide (2 parts by weight), a vulcanizing accelerator (Soxinol® CZ manufactured by Sumitomo Chemical Company, Limited) (1 part by weight), a vulcanizing accelerator (Soxinol® D manufactured by Sumitomo Chemical Company, Limited) (1 part by weight), wax (Sunnock® N manufactured by OUCHI SHINKO CHEMICAL INDUSTRIAL) (1.5 parts by weight) and sulfur (1.4 parts by weight). The resulting polymer composition was molded into a sheet with 6-inch rolls, and the resulting sheet was heated and vulcanized at 160° C. for 45 minutes to prepare a vulcanized sheet. The results of evaluation of the physical properties of the vulcanized sheet are shown in Table 1.

Example 2

Example 1 was repeated, except that the supply amount of the aqueous solution of the sodium salt of S-(3-aminopropyl) thiosulfuric acid per 100 parts by weight of the 1,3-butadiene-styrene copolymer was changed to 1.5 parts by weight.

The Mooney viscosity of the resultant oil extended modified polymer was 71, and the molecular weight distribution (Mw/Mn) of the modified polymer was 1.7. The results of evaluation of the physical properties of the vulcanized sheet are shown in Table 1.

Comparative Example 1

A polymer composition was prepared by kneading the following materials in a laboplast mill: the oil extended 1,3-butadiene-styrene copolymer (118 parts by weight) as the raw material used in Example 1 [a content of the extender oil per 100 parts by weight of the 1,3-butadiene-styrene copolymer=18 parts by weight; the 1,3-butadiene-styrene copolymer having a styrene content of 28% by weight and a vinyl content of 36% by mol; a Mooney viscosity (ML$_{1+4}$ (100° C.))=70; and a molecular weight distribution (Mw/Mn)=1.7], silica (ULTRASIL® VN3-G manufactured by Evonik Degussa GmbH) (78.4 parts by weight), a silane coupling agent (Si69® manufactured by Evonik Degussa GmbH) (6.4 parts by weight), carbon black (DIABLACK® N339 manufactured by Mitsubishi Chemical Corporation) (6.4 parts by weight), an extender oil (NC-140 manufactured by Nippon Oil Corporation) (29.6 parts by weight), an antioxidant (Antigen® 3C manufactured by Sumitomo Chemical Company, Limited) (1.5 parts by weight), stearic acid (2 parts by weight), zinc oxide (2 parts by weight), a vulcanizing accelerator (Soxinol® CZ manufactured by Sumitomo Chemical Company, Limited) (1 part by weight), a vulcanizing accelerator (Soxinol® D manufactured by Sumitomo Chemical Company, Limited) (1 part by weight), wax (Sunnock® N manufactured by OUCHI SHINKO CHEMICAL INDUSTRIAL) (1.5 parts by weight) and sulfur (1.4 parts by weight). The resulting polymer composition was molded into a sheet with 6-inch rolls, and the resulting sheet was heated and vulcanized at 160° C. for 45 minutes to prepare a vulcanized sheet. The results of evaluation of the physical properties of the vulcanized sheet are shown in Table 1.

TABLE 1

|  | Example 1 | Example 2 | Comparative Example 1 |
|---|---|---|---|
| tan δ balance tan δ (0° C.)/ tan δ (70° C.) | 2.63 | 2.70 | 2.27 |

The invention claimed is:

1. A modified conjugated diene-based polymer obtained by melt-kneading a conjugated diene-based polymer and 0.01 to 2 parts by weight of a Bunte salt per 100 parts by weight of the conjugated diene-based polymer, in the presence of water whose amount is from 0.1 to 1,000 parts by weight per one part by weight of the Bunte salt.

2. The modified conjugated diene-based polymer of claim 1, wherein the Bunte salt is S-(3-aminopropyl)thiosulfuric acid or its metal salt.

3. The modified conjugated diene-based polymer of claim 2, wherein the metal salt is at least one metal salt selected from the group consisting of a lithium salt of S-(3-aminopropyl)thiosulfuric acid, a sodium salt of S-(3-aminopropyl)thiosulfuric acid, a potassium salt of S-(3-aminopropyl)thiosulfuric acid, a cesium salt of S-(3-aminopropyl)thiosulfuric acid, a cobalt salt of S-(3-aminopropyl)thiosulfuric acid, a copper salt of S-(3-aminopropyl)thiosulfuric acid and a zinc salt of S-(3-aminopropyl)thiosulfuric acid.

4. The modified conjugated diene-based polymer of claim 1, wherein the conjugated diene-based polymer is a conjugated diene-vinyl aromatic compound copolymer.

5. A polymer composition containing
a polymer component, and
10 to 150 parts by weight of a reinforcing agent per 100 parts by weight of the polymer component,
wherein 10% by weight or more of the modified conjugated diene-based polymer defined in claim 1 is contained, provided that the amount of the polymer component is 100% by weight, and wherein 30% by weight or more of silica is contained per 100% by weight of the reinforcing agent.

6. The polymer composition of claim 5, containing 1 to 20 parts by weight of a silane coupling agent per 100 parts by weight of the silica.

* * * * *